(No Model.)
J. SANDIFORD, Sr.
BRAKE.
No. 605,801. Patented June 14, 1898.
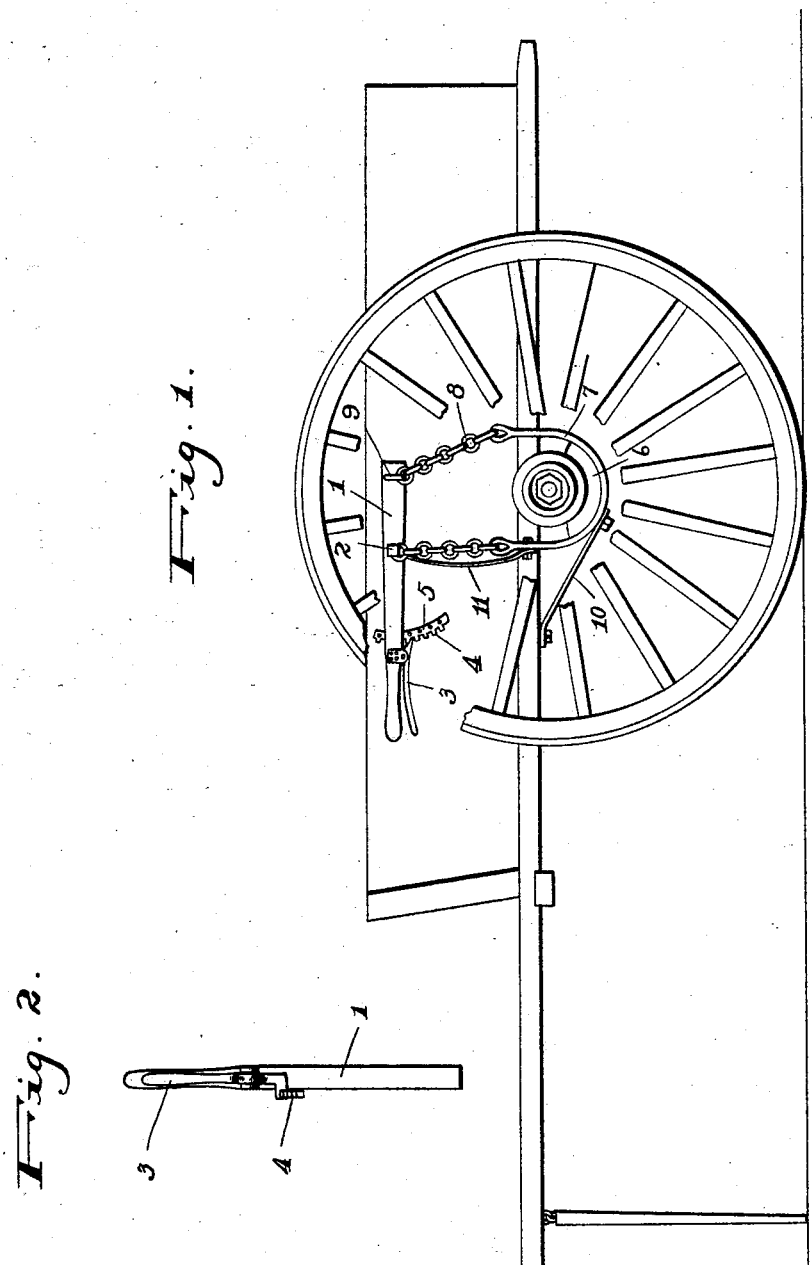
Witnesses
F. B. Berry,
Victor J. Evans
Inventor
John Sandiford Sr.,
by John Wedderburn.
Attorney

UNITED STATES PATENT OFFICE.

JOHN SANDIFORD, SR., OF WYNDMOOR, PENNSYLVANIA.

BRAKE.

SPECIFICATION forming part of Letters Patent No. 605,801, dated June 14, 1898.

Application filed July 21, 1897. Serial No. 645,402. (No model.)

*To all whom it may concern:*

Be it known that I, JOHN SANDIFORD, Sr., of Wyndmoor, in the county of Montgomery and State of Pennsylvania, have invented certain new and useful Improvements in Brakes; and I do hereby declare the following to be a full, clear, and exact description of the invention, such as will enable others skilled in the art to which it appertains to make and use the same.

This invention relates to vehicle-brakes; and the object in view is to provide a simple and efficient brake which is especially adapted for use in connection with wagons, carts, and similar vehicles, which is capable of quick and easy application, and which provides the necessary braking power for checking the wheels and bringing the vehicle to a stop. The detailed objects and advantages of the invention will appear in the course of the ensuing description.

The invention consists in an improved brake embodying certain novel features and details of construction and arrangement of parts, as hereinafter fully described, illustrated in the drawings, and incorporated in the claims hereto appended.

In the accompanying drawings, Figure 1 represents a side elevation of a sufficient portion of a vehicle to show the application of the improved brake thereto. Fig. 2 is a detail view of the lever-catch.

Referring to the drawings, 1 designates the brake-lever, which is fulcrumed intermediate its ends upon a bolt or stud-shaft 2, projecting laterally from the body of the vehicle or from the running-gear, as may be most convenient. This lever is arranged above the axle and is provided at or near its free end, or that end which is grasped by the hand for applying the brakes, with a pawl or dog 3, adapted to be moved into engagement with any one of a series of ratchet-teeth 4 on a rack 5, secured to the side of the body of the vehicle, whereby when the brake-lever is vibrated for applying the brake said pawl will engage the teeth and hold the brake applied.

The brake-shoe indicated at 6 is of segmental form and adapted to extend partially around the hub of a wheel or partially around a friction-wheel applied to the inner side of one of the vehicle-wheels, as may be preferred. Secured to the outer or convex surface of the brake-shoe is a metal band or strap 7, the ends of which project beyond the ends of the shoe, and attached to each end of said strap 7 is a chain or other flexible connection 8, one of the chains or connections 8 extending to and connecting with the fulcrum-bolt 2, and the other chain connecting to the rear or short end of the lever, where an eyebolt 9 is secured to receive the said chain 8.

10 designates a stay which is connected at one end to the running-gear and at its opposite end to the outer surface of the brake-shoe 6. A similar stay 11 is connected at one end to the bolt 2 and at its opposite end to the adjacent end of the strap 7.

When the brake-lever is rocked for applying the brake, the shorter end of the lever 1 is elevated, thereby throwing the brake-shoe 6 into contact with the hub of the wheel in a manner that will be readily understood. The frictional engagement with the wheel tends to drag the brake-shoe in a rearward direction; but this is overcome and prevented by the stay 10, which extends in a direction in which the strain comes, thus taking all or the major portion of the tension from the strap 7 and chain 8 at the forward end of the shoe.

It will of course be understood that the brake may be made in any suitable size and varied considerably in matter of detail to accommodate the same to varying conditions. I therefore do not wish to be limited to the precise construction hereinabove described, but reserve to myself the right to change, modify, or vary the construction within the scope of this invention.

Having thus described the invention, what is claimed as new, and desired to be secured by Letters Patent, is—

1. In a vehicle-brake, a lever fulcrumed intermediate its ends and means for engaging and holding said lever, in combination with a brake-shoe for engagement with one of the vehicle-wheels, flexible connections between the ends of said shoe and the brake-lever, one of which is connected to the fulcrum of the lever, and the other to the shorter arm of said lever, and a stay-rod or brace connected at its forward end to the running-gear, and at its opposite end to said brake-shoe, substantially as described.

2. In a vehicle-brake, the combination with a lever fulcrumed intermediate its ends, of a brake-shoe, a strap secured to the outer surface of said shoe and projecting at its ends beyond the ends of said shoe, a flexible connection between one end of said strap and the fulcrum of the lever, a second flexible connection between the opposite end of said strap and the short arm of the lever, and a stay-rod or brace in front of said shoe, connected at one end thereto and at its opposite end to the running-gear, all arranged for joint operation, substantially as described.

In testimony whereof I have signed this specification in the presence of two subscribing witnesses.

JOHN SANDIFORD, Sr.

Witnesses:
HARRY E. FISHER,
JOSEPH G. EARNEST.